United States Patent
Ortiz

[15] 3,666,291
[45] May 30, 1972

[54] OCCUPANT PROPELLED AMUSEMENT VEHICLE

[72] Inventor: Ralph G. Ortiz, 107 North Brier Road, Tonawanda, N.Y. 14150

[22] Filed: Nov. 16, 1970

[21] Appl. No.: 89,641

[52] U.S. Cl. ..........................280/226 R, 280/252, 280/262
[51] Int. Cl. .........................................................B62m 1/18
[58] Field of Search ............280/220, 221, 226 R, 227, 252, 280/262, 11.11 R, 247, 256, 226 A; 74/89

[56] References Cited

UNITED STATES PATENTS

| 334,839 | 1/1886 | Baines | 280/252 X |
| 1,338,448 | 4/1920 | Herzog | 280/226 A |
| 1,820,474 | 8/1931 | Molinari | 280/262 X |
| 2,536,569 | 1/1951 | Purkey | 280/11.11 R |
| 3,133,747 | 5/1964 | Nelson | 280/226 R |

*Primary Examiner*—Kenneth H. Betts
*Attorney*—Christel & Bean

[57] ABSTRACT

An amusement vehicle comprising an operator member such as a spring-biased seat movably mounted on a vehicle frame, in which frame supporting wheels are rotatably mounted, which operator member is adapted to be reciprocated by the rider. A motion transmission mechanism comprises a pair of links each connected at one arm portion to the operator member and pivoted in response to reciprocation of the operator member. Each link includes another arm portion which is connected to a corresponding pivot point offset from the axis of a shaft connected to at least one of the wheels, whereby the shaft and wheel are rotated as the link arm portions are moved relative to each other.

10 Claims, 3 Drawing Figures

INVENTOR.
Ralph G. Ortiz
BY
Christel & Bean
ATTORNEYS.

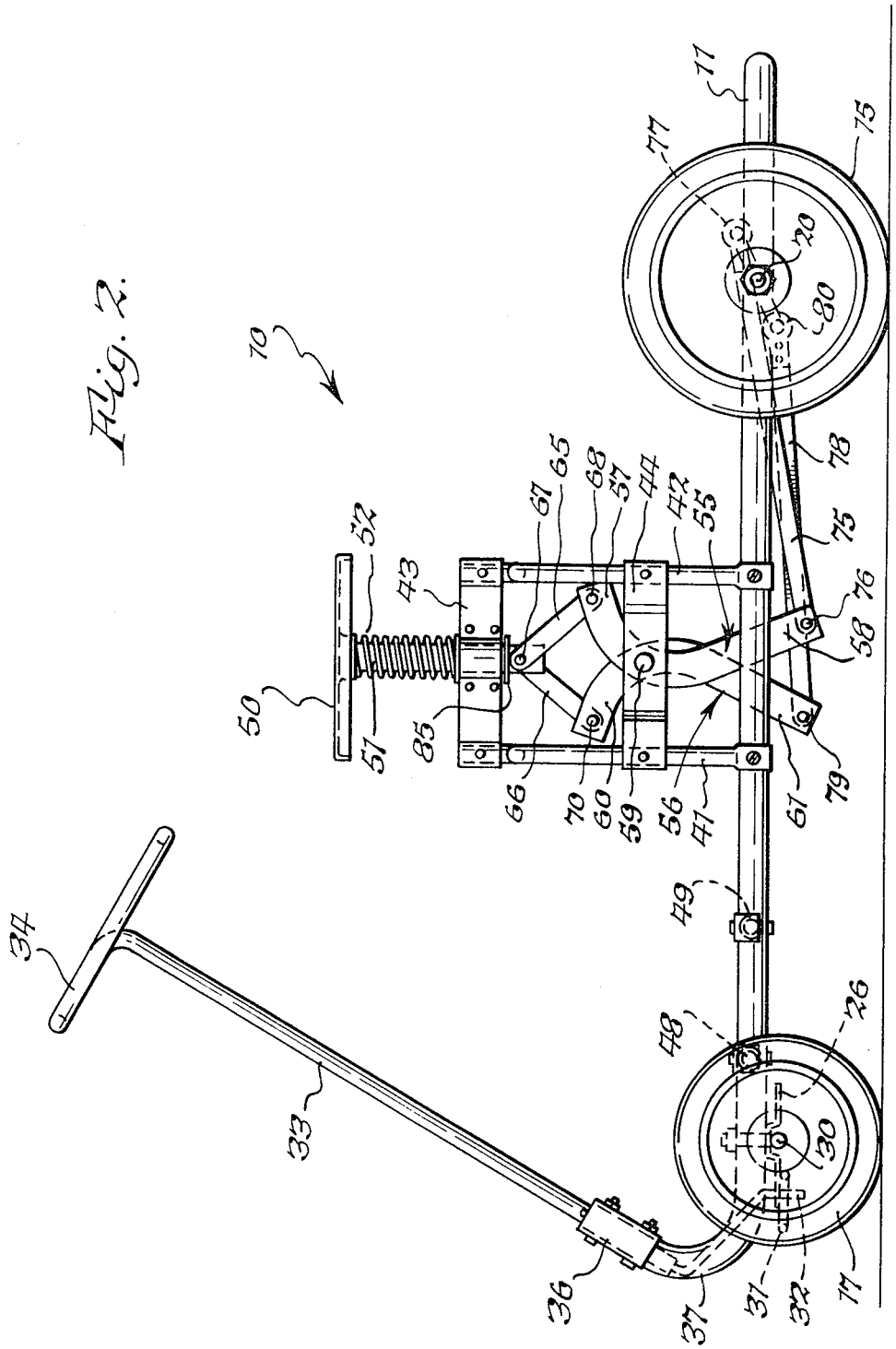

OCCUPANT PROPELLED AMUSEMENT VEHICLE

BACKGROUND OF THE INVENTION

This invention relates to amusement vehicles and, more particularly, to a new and improved amusement vehicle propelled in response to movements of the rider.

A primary object of the present invention is to provide a new and improved vehicle wherein a force provided by the rider, such as from his weight, is utilized to propel the vehicle thereby furnishing both amusement and healthful exercise for the rider.

It is a further object of the present invention to provide such a vehicle which is easily and safely operated by the rider and is simple and economical in construction.

SUMMARY OF THE INVENTION

The present invention provides an amusement vehicle comprising an operator member movably mounted in a vehicle frame, in which frame wheels are rotatably mounted, which operator member is adapted to be reciprocated by force applied by the rider. A motion transmission mechanism operatively connected to said member and to at least one of said wheels causes rotation of the wheel in response to reciprocation of the operator member. The motion transmission mechanism comprises a pair of links each connected at one arm portion to the operator member and pivoted in response to reciprocation of the operator member. Each link includes another arm portion which is connected to a corresponding pivot point offset from the axis of a shaft connected to the wheel, whereby the shaft and wheel are rotated as the link arm portions are moved relative to each other.

The foregoing and additional advantages and characterizing features of the present invention will become clearly apparent upon a reading of the ensuing detailed description together with the including drawing wherein:

BRIEF DESCRIPTION OF THE DRAWING FIGURES

FIG. 2 is a side elevational view of the amusement vehicle of FIG. 1; and

DETAILED DESCRIPTION OF THE ILLUSTRATED EMBODIMENT

Figure 1:
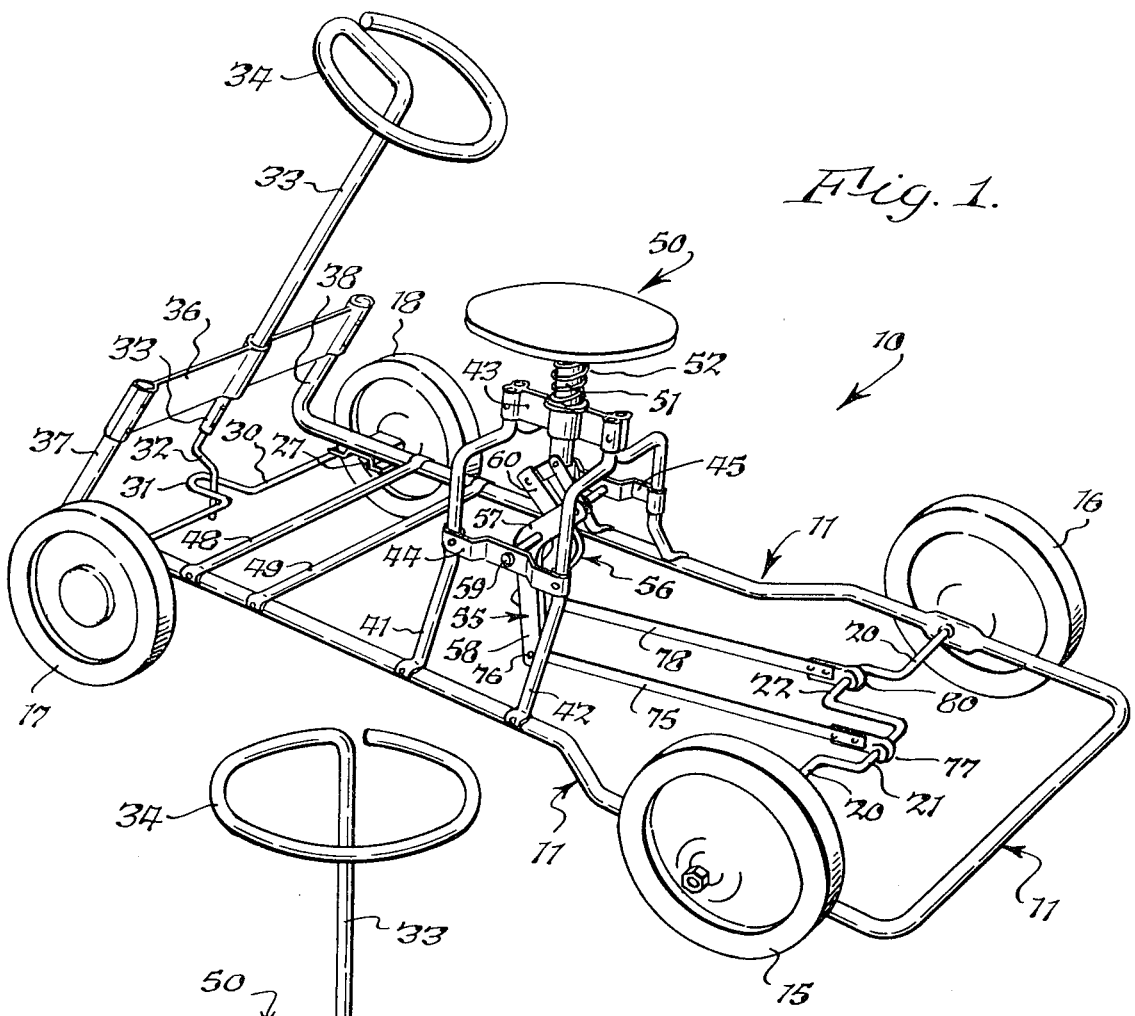
FIG. 1 is a perspective view of an amusement vehicle constructed according to the present invention.
Figure 3:
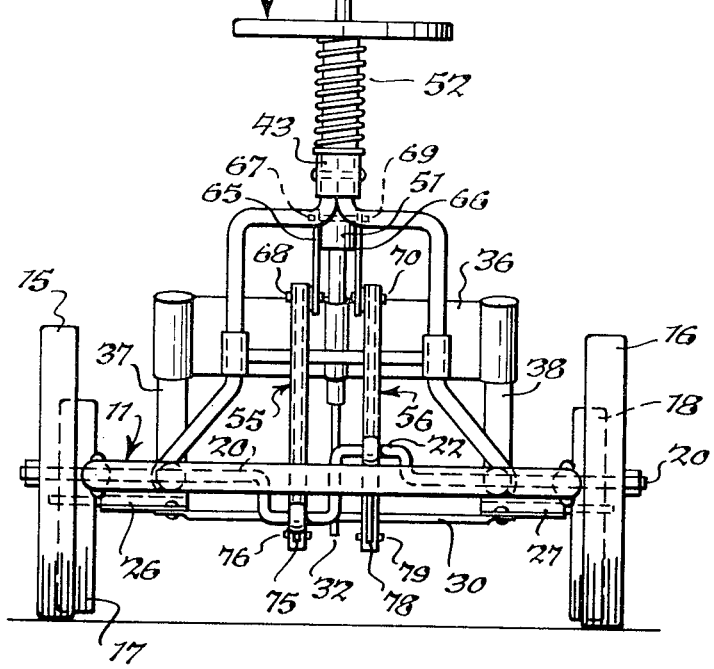
FIG. 3 is a rear end elevational view of the amusement vehicle of FIG. 1.

An amusement vehicle according to the present invention is indicated generally at 10 in the drawing and comprises a frame 11 of generally U-shaped configuration and disposed in a horizontal plane. Frame 11 is oriented whereby the web or base portion thereof is at the rear of the vehicle 10 and the legs thereof define the sides of the vehicle. Frame 11 preferably is formed of tubular metal stock, and a plurality of supporting wheels, in the present illustration four wheels designated 15-18, are rotatably mounted in frame 11. In particular, wheels 15, 16 comprise a pair of rear wheels for vehicle 10 and are mounted on opposite ends of an axle 20 which, in turn, is rotatably mounted in frame 11, as by passing through aligned holes provided in each of the leg portions of frame 11. Axle 20 is formed to include offset portions 21, 22 relative to the axis thereof for a purpose which will be described presently.

Wheels 17, 18 comprise a pair of front wheels for vehicle 10, and each is rotatably connected to a corresponding one of members 26, 27, each of which is pivotally mounted on frame 11 to permit steering of vehicle 10. Members 26, 27 are pivotally mounted in alignment on corresponding legs of frame 11 and are connected together by a rod 30, provided with a generally U-shaped extension 31 about mid-way along the length thereof. The opposite legs of extension 31 are engaged selectively by an operator member 32 which, in turn, is fixedly attached to the lower end of a steering shaft 33, the upper end of which is provided with a steering wheel 34 which is grasped by the rider to steer vehicle 10 in the usual manner. Steering shaft 33 is rotatably mounted in a supporting member 36 which is fixedly secured at opposite ends thereof to corresponding upwardly directed ends 37, 38 of the legs of frame 11.

First and second supporting members 41 and 42, respectively, are attached to frame 11 near the middle thereof and extend upwardly from the plane of frame 11. Each of the supporting members 41, 42 preferably is of two part construction, formed from tubular stock, and when attached to frame 11 is of a generally inverted U configuration. In particular, member 41 is mounted at the end of each leg thereof to corresponding legs of frame 11, and the upwardly directed terminating ends of the web or base defining portions of member 41 are joined by one end of a bracket 43. Member 42 is mounted rearwardly of member 41, relative to vehicle 10, and in a similar manner to frame 11, and the upwardly directed terminating ends of the web or base defining portions of member 42 are joined by the other end of bracket 43. A first auxiliary supporting bracket 44 is connected at opposite ends thereof to members 41 and 42 on one side of the assembly, and a second auxiliary supporting bracket 45 is connected at opposite ends thereof to members 41 and 42 on the other side of the assembly. Members 41, 42 together with brackets 43-45 comprise a portion of the frame of vehicle 10.

Vehicle 10 includes a support or rest on frame 11 for the rider's feet. In preferred form, a footrest comprises two relatively rigid rods or bars 48, 49 attached at each end thereof to corresponding legs of frame 11, the rods 48, 49 being spaced relatively close to each other and located on frame 11 near the front of the vehicle. Vehicle 10 further comprises a seat 50 having a shaft or plunger 51 attached to the bottom thereof. Shaft 51 is received in an opening provided in bracket 43 of a size permitting reciprocation of shaft 51 therethrough. A coil spring 52 is included around shaft 51, being secured at one end to bracket 43 and at the other end to shaft 51 or seat 50, thereby providing an upwardly directed biasing or restoring force for seat 50. As the rider sitting on seat 50 moves or shifts his weight to move seat 50 down against the force of spring 52, movements of shaft 51 are utilized to propel vehicle 10 by means of a motion transmission mechanism which now will be described.

The motion transmission mechanism of the present invention comprises first and second link members 55 and 56, respectively, each of which in turn has two portions extending at an angle to each other. In particular, and referring to FIG. 2, link 55 includes a first arm portion 57 and a second, relatively longer arm portion 58 which extends at about a right angle to arm portion 57. The two arm portions 57, 58 meet in a smooth, generally curved juncture or transition region, whereby link 56 is somewhat arcuate, at which juncture or region link 55 is pivotally mounted to the vehicle frame. In particular, link 85 is pivotally mounted on a rod or shaft 59 which is secured at opposite ends thereof to corresponding ones of the auxiliary brackets 44, 45. Link 55 preferably is formed from a hollow member of tubular or rectangular cross section, whereby rod 59 contacts link 55 at two spaced-apart locations to provide a positive pivot and prevent wobbling of link 55. Similarly, link 56 includes a first arm portion 60 and a second, relatively longer arm portion 61 which extends at about a right angle to arm portion 60. The two arm portions 60, 61 meet in a smooth, generally curved juncture or transition region, whereby link 56 is somewhat arcuate, at which junction or region link 56 is pivotally mounted to the vehicle frame. Accordingly, link 56 is pivotally mounted on shaft 59 and spaced axially therealong from link 55, and for similar reasons preferably is formed from a hollow member in a manner like that of link 55. Accordingly, links 55 and 56 are pivotally mounted to the frame of vehicle 10 for movement about a pivot axis and in parallel planes disposed in the general direction of travel of vehicle 10.

The motion transmission mechanism further comprises means in the form of first and second arm members 65 and 66, respectively, for connecting shaft 51 to links 55 and 56. In particular, one end of arm 65 is pivotally connected at 67 to shaft 51, and the opposite end of arm 65 is pivotally connected at 68 to arm portion 57 of link 55. Similarly, one end of arm 66 is pivotally connected at 69 to shaft 51, and the opposite end of arm 66 is pivotally connected at 70 to arm portion 60 of link 56. By virtue of this arrangement, in response to reciprocation of seat 50 and shaft 51, links 55 and 56 are pivoted about shaft 59 and arm portions 58 and 61 of links 55 and 56, respectively, are moved toward and away from each other.

The motion transmission mechanism finally includes means for coupling arm portions 58 and 61 of links 55 and 56, respectively, to wheels 15, 16 whereby the movements of links 55, 56 are utilized to propel vehicle 10. In particular, and referring to FIG. 1, a first arm member 75 is pivotally connected at one end thereof to arm portion 58 of link 55 at 76, and arm 75 is pivotally connected at the other end thereof to portion 21 of shaft 20 such as by a coupling member 77. Similarly, a second arm member 78 is pivotally connected at one end thereof to arm portion 61 of link 56 at 79, and arm 78 is pivotally connected at the other end thereof to portion 22 of shaft 20 such as by a coupling member 80. By virtue of this arrangement, the points at which arms 75, 78 are pivotally connected to shaft 20 are spaced in the direction of the axis of shaft 20 a distance sufficient to permit independent movement of arms 75, 78 without any interference from each other. In addition, these two points are spaced along a line which is disposed generally perpendicular to the axis of shaft 20 and which preferably intersects the axis of shaft 20. In the present illustration, this line coincides with shaft portion 23.

In operation, the rider places himself on vehicle 10 in a manner whereby he sits on seat 50 and rests his feet on supports 48, 49. When the rider shifts his weight to force seat 50 downwardly, the downward movement of seat 50 is transmitted through shaft 51 to arms 65, 66 which, in turn, apply a downward force to arm portions 57 and 60 of links 55 and 56, respectively. These downward forces applied at points 68 and 70 cause links 55 and 56 to be pivoted about shaft 59, with the result that arm portions 58 and 61 thereof are moved toward each other. In particular, arm portion 58 is moved toward wheels 17, 18 at the front of vehicle 10, and arm portion 61 is moved toward wheels 15, 16 at the rear of vehicle 10.

The movements of arm portions 58, 61 are coupled to wheels 15, 16 through arms 75, 78 and shaft 20. In particular, the forward movement of portion 58 of link 55 is transmitted through arm 75 to move shaft portion 21 in the same direction through an arc thereby rotating shaft 20 in a counterclockwise direction. Similarly, the rearward movement of portion 61 of link 56 is transmitted through arm 78 to move shaft portion 22 in the same direction through an arc thereby also rotating shaft 20 in a counterclockwise direction. In other words, the point at which arm 75 is pivotally connected to shaft portion 21 is moved through a 180° arc defining one-half the circumference of a circle, and the point at which arm 78 is pivotally connected to shaft portion 22 is moved through another 180° arc defining the remaining half the circumference of that same circle. The diameter of this illustrative circle is the straight line distance between points 77 and 80. This occurs in response to downward movement of seat 50 and causes one-half of a complete rotation of shaft 20 and, hence, wheels 15 and 16.

When the rider shifts his weight to his feet resting on supports 48, 49 seat 50 is moved upwardly by the force of spring 52 and returned to its original position. The upward travel of seat 50 can be limited by a collar member 85 provided on shaft 51 to engage bracket 43 as shown in FIG. 2. The upward movement of seat 50 and shaft 51 is transmitted through arms 65 and 66 to links 55 and 56 causing them to pivot about shaft 59. As a result, arm portions 58 and 61 of links 55 and 56, respectively, are moved away from each other and returned to the position shown in FIG. 2. As a result, arm 75 is moved toward wheels 15, 16 at the rear of vehicle 10, and arm 78 is moved toward wheels 17, 18 at the front of vehicle 10. This, in turn, causes an additional half-rotation of axle 20 and wheels 15, 16 as should be apparent upon proceeding through an analysis similar to that applied to the situation wherein seat 50 was moved downwardly. When seat 50 returns to its original position at the limit of upward travel, the points of connection of arm 75 to shaft portion 21 and of arm 78 to shaft portion 22 will return to their original positions as shown in FIG. 1.

Therefore in response to a single depression or downward movement of seat 50 together with a return of seat 50 in an upward direction to its original or starting position, shaft 20 and, hence, wheels 15 and 16 are rotated through a single, complete rotation to propel vehicle 10 in a forward direction. Wheels 17 and 18 are freely rotatable and steerable under control of wheel 34. To cause vehicle 10 to continue to move in a forward direction, the rider must again depress seat 50 and continue this up and down motion for as long as he desires to propel vehicle 10. If the rider stops applying a downward force on seat 50 whereby the latter remains in the uppermost position, vehicle 10 is no longer propelled and quickly comes to a stop. Thus by merely shifting his weight to his feet, the rider can effect a rather quick stopping or braking of vehicle 10. This is because axle 20 on which rear wheels 15, 16 are mounted, is connected to a mechanism including arms 75, 78, links 55, 56, arms 65 and 66 and shaft 51 which has sufficient inertia to effectively brake wheels 15, 16. In other words, w wheels 15, 16 do not possess enough inertia to force compression of spring 52, but rather a positive force must be applied to arms 65, 66 as through seat 50.

Vehicle 10 of the present invention can be propelled in a rearward or reverse direction by a simple manipulation changing the starting position of arms 75, 78. This can be done by rotating wheels 15, 16 slightly to change the relative positions of the pivotal connections of arms 75, 78 to shaft portions 21 and 22, respectively. Then upon depression of seat 50 by the rider, vehicle 10 is propelled in a rearward or reverse direction.

Seat 50, shaft 51 and spring 52 comprise an operator member movably mounted in the frame of vehicle 10, and the operator member is moved or reciprocated in response to application of force by the rider. The movements or reciprocations are applied to the motion transmission mechanism to propel vehcile 10. Alternately, a handle or similar arrangement could be substituted for seat 50 whereby the required force input could be provided by the rider by hand rather than by the vertical movements of his body.

According to the present illustration shaft 20 is formed to include offset portions 21, 22 joined by portion 23 which passes through the axis of shaft 20 in a direction generally perpendicular thereto. Alternatively, a straight shaft could be provided having mounted thereon a member disposed in a plane perpendicular to the axis of shaft 20 providing pivotal connections for arms 75, 78 spaced apart a slight axial distance and offset from the axis of shaft 20.

According to a preferred mode of the present invention, the distance from the axis of shaft 20 to the pivot axis of bushing 77 on shaft portion 21 is about 1.5 inches and from the axis of shaft 20 to the pivot axis of bushing 80 also is about 1.5 inches. The distance measured along arm 75 from pivot point 76 to the point of pivotal connection on shaft portion 21 is about 11 15/16 inches. The same distance is measured between corresponding points along arm 78. Arm portions 58 and 61 of links 55 and 56, respectively, each have a length of about 5.0 inches, measured from the pivot axis of shaft 59 to either of the pivot points 76 or 79. Arm portions 57 and 60 of links 55 and 56, respectively, each have a length of about 2 12/32 inches, measured from the pivot axis of shaft 59 to either of the pivot points 68 or 70. Arms 65 and 66 each have a length of about 3.0 inches, measured from the corresponding point of connection to shaft 51 to either of the pivot points 68, 70. With the foregoing dimensions and the proper force constant for spring 52, the distance seat 50 travels in a vertical direction is about 1 ⅜ inches. The foregoing dimensions are given by way of example and of course can be changed proportionally.

It is therefore apparent that the present invention accomplishes its intended objects. Vehicle 10 is propelled by a force from the rider, as by alternately shifting his weight to depress and release seat 50, thereby furnishing both amusement and healthful exercise. The inherent braking action, wherein seat 50 must be continually reciprocated to continue movement of vehicle 10, is beneficial both to enhance amusement and insure safety for the rider. Vehicle 10 of the present ivention is easy to operate and is of a construction which is simple and economical to manufacture and maintain.

While a single specific embodiment of the present invention has been described in detail, this is done by way of illustration without thought of limitation.

I claim:

1. A vehicle comprising a frame, a plurality of supporting wheels rotatably mounted in said frame, an operator member movably mounted in said frame and adapted to be reciprocated in response to application of force by the rider, and a motion transmission mechanism comprising:
   a. a pair of links, each link having first and second arm portions which meet at a juncture, said links being pivotally mounted each at said juncture to said frame;
   b. means for connecting said operator member to said first arm portion of each of said links, whereby in response to reciprocation of said operator member said second arm portions of said links are moved toward and away from each other;
   c. a shaft connected to at least one of said supporting wheels for rotation therewith, said shaft including means providing a pair of pivot points offset from the axis of said shaft in generally opposite directions; and
   d. means for connecting each of said second arm portions of said links to a corresponding one of said pivot points on said shaft whereby said shaft is rotated in response to reciprocation of said operator member.

2. A vehicle according to claim 1 wherein said operator member comprises a spring biased shaft, one end of said shaft being connected to said motion transmission means and the other end having a force applying member which is contacted by the rider.

3. A vehicle according to claim 2 wherein said force applying member comprises a seat, whereby said shaft is reciprocated in response to certain movements of the rider's body.

4. A vehicle according to claim 1 wherein the angle between said first and second arm portions of each of said links is about 90°.

5. A vehicle according to claim 1 wherein said links are pivotally mounted along a common axis for movement in planes generally parallel to the direction of movement of said vehicle.

6. A vehicle according to claim 1 wherein the maximum distance between the ends of said second arm portions of said links is equal to the distance between the pivot points on said shaft whereby a complete rotation of said shaft occurs in response to each complete cycle of reciprocation of said operator member.

7. A vehicle according to claim 1 wherein said pair of pivot points are located along a line perpendicular to and intersecting the axis of said shaft.

8. A vehicle according to claim 1 wherein said shaft is connected to a pair of said supporting wheels located near one end of said vehicle and further including steering means movably connected to said frame and operatively connected to another pair of said supporting wheels located near the opposite end of said vehicle.

9. A vehicle according to claim 1 wherein said means for connecting said operator member comprises an arm member pivotally connected at one end to said operator member and pivotally connected at the other end thereof to the first arm portion of one of said links and another arm member pivotally connected at one end to said operator member and pivotally connected at the other end thereof to the first arm portion of the other of said links.

10. A vehicle according to claim 1 wherein said means for connecting said second arm portions comprises a first arm member pivotally connected at one end to the second arm portion of one of said links and pivotally connected at the other end thereof to one of said shaft pivot points and a second arm member pivotally connected at one end to the second arm portion of the other of said links and pivotally connected at the other end thereof to the other of said shaft pivot points.

* * * * *